June 17, 1958     S. H. FAIRWEATHER ET AL     2,839,694
LOAD SENSING SYSTEM
Filed July 15, 1954     2 Sheets-Sheet 1
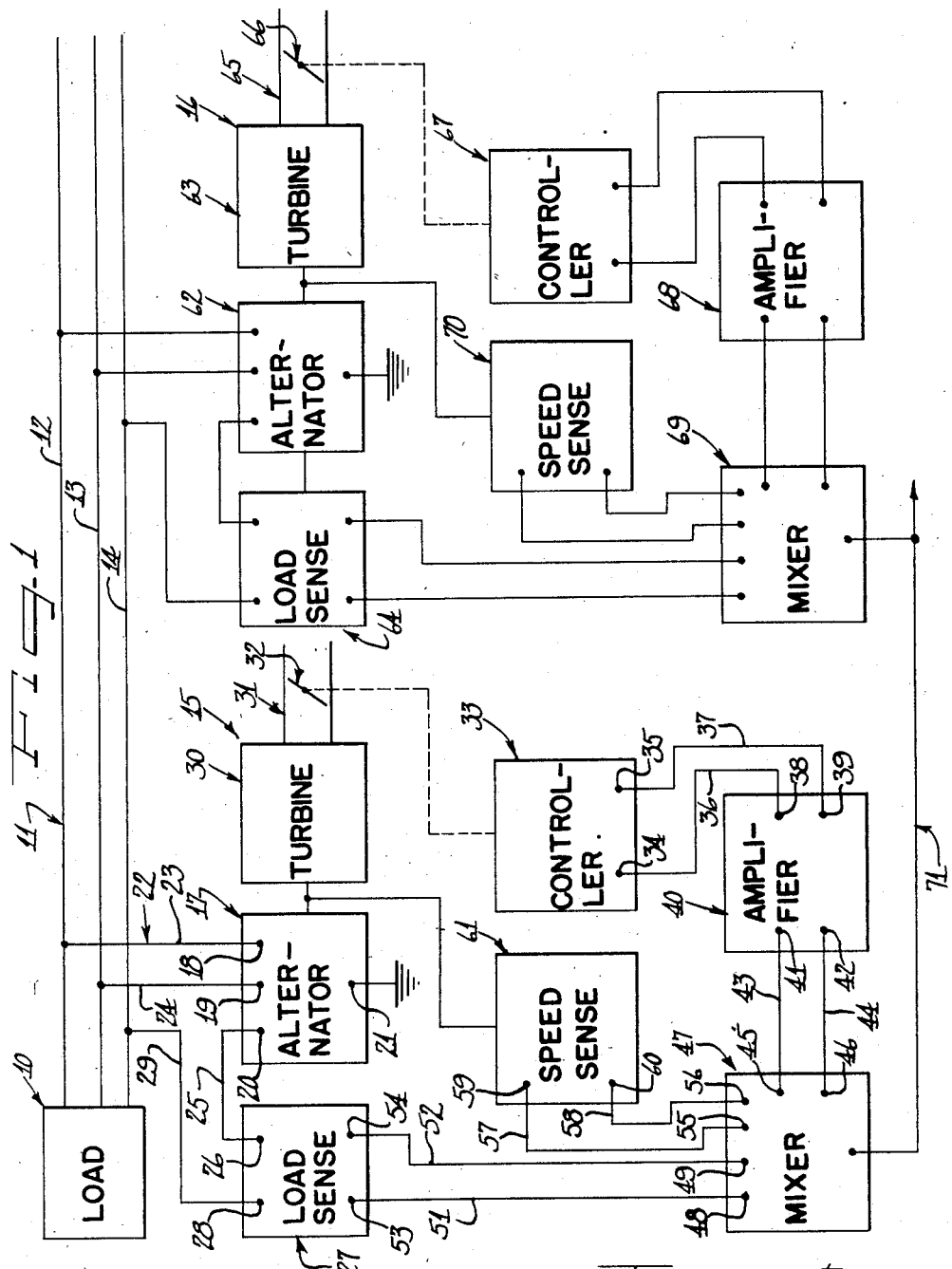
Stephen H. Fairweather
Kurt Seldner

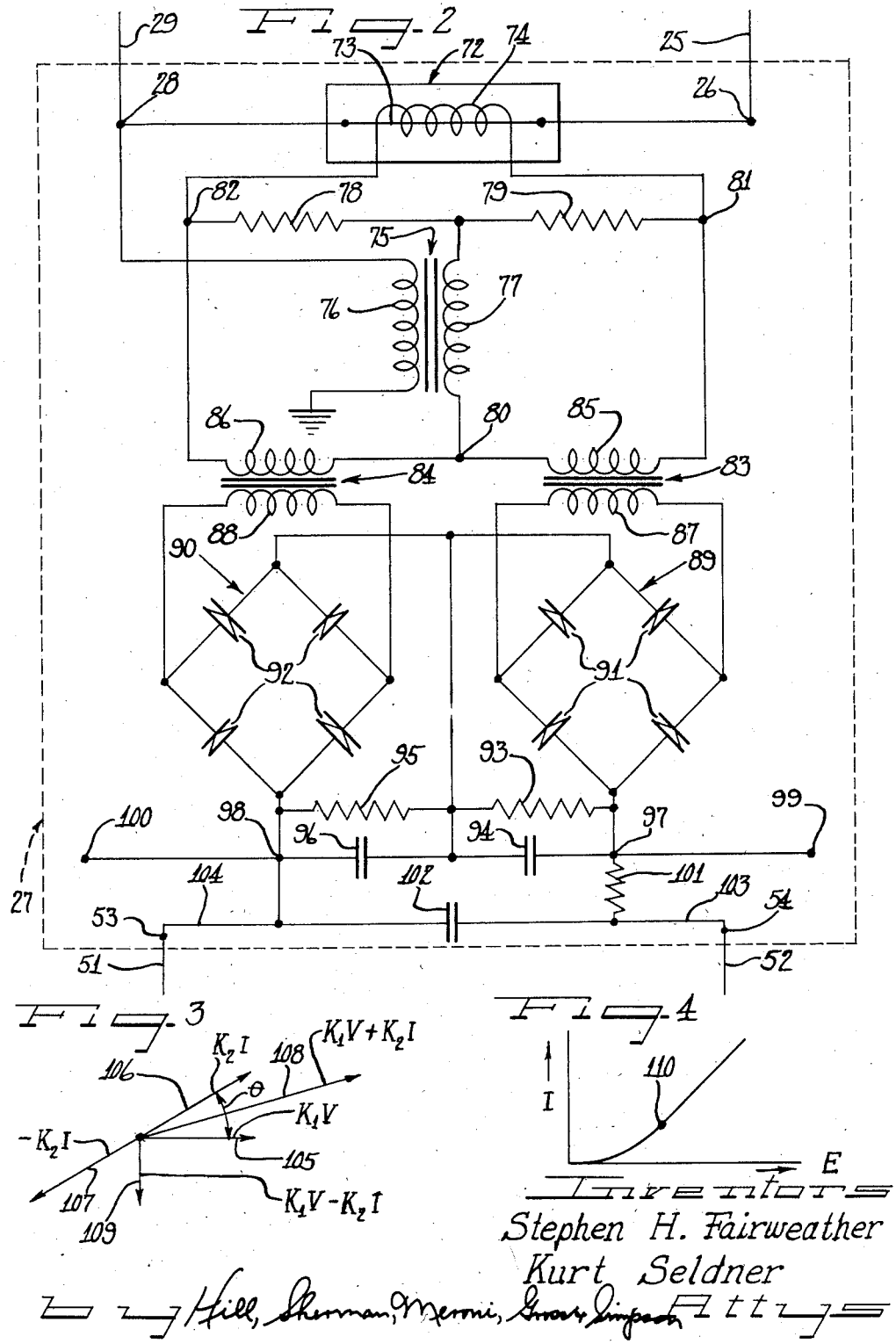

United States Patent Office 2,839,694
Patented June 17, 1958

2,839,694

LOAD SENSING SYSTEM

Stephen H. Fairweather, South Euclid, and Kurt Seldner, Cleveland, Ohio, assignors to Thompson Products, Inc., Cleveland, Ohio, a corporation of Ohio Application July 15, 1954, Serial No. 443,483

2 Claims. (Cl. 307—153)

This invention relates to a load sensing system and particularly to a load sensing system which is very accurate, rugged and rapid in response and is particularly adapted for use in alternator control systems and especially for aircraft alternator control systems.

In an exemplary application of this invention, a plurality of alternators are connected to a common load and means are provided for regulating the output of each alternator including load sensing means for sensing the power output of each alternator, with means being provided for interconnecting the regulating means to maintain a predetermined load division between alternators.

The alternators may, for example, be in an airplane and may be driven by air turbines with the power output of the alternators controlled by controlling the air flow to the turbines. For this purpose, a valve in the air intake of each turbine may be actuated by a suitable controller connected to the output of amplifier means such as an amplidyne or preferably a magnetic amplifier. The input of the amplifier may be connected both to a speed sensing system responsive to the speed of the alternator and the load sensing system responsive to the power output of the alternator. The speed and load sensing systems coact to obtain a predetermined droop or decrease in speed with increasing load, which may be termed a "scheduled droop characteristic," with the speed being an exact function of load and independent of any other factor. The regulating systems from the alternators may be interconnected so as to obtain a predetermined load division between alternators.

It will be appreciated that in systems of this type, it is essential that the various elements be extremely fast in response so as to avoid any "hunting" or oscillations and to achieve stable operation. It will be further apparent that the elements must be extremely accurate, particularly the load and speed sensing elements, and that the elements should be very reliable and rugged, particularly when used in an airplane alternator system.

The load sensing system of this invention may comprise means for developing signals respectively proportional to and in fixed phase relation to alternator output current and voltage and means for combining and rectifying such signals to provide a direct current output indicative of the instantaneous power output of the alternator.

In accordance with a specific feature of the invention, the signals proportional to and in fixed phase relation to alternator output current and voltage may be combined to obtain signals respectively proportional to the vector sum and the vector difference of such signals obtained from alternator output current and voltage and then the second pair of signals respectively proportional to the vector sum and difference of the first pair of signals may be applied to means that will give an output proportional to the difference between the squares of the magnitudes of such second pair of signals. By taking the difference of the square of such signals, an output voltage is developed which is directly proportional to real power output of the alternator, irrespective of the phase angle between alternator voltage and alternator current.

To develop and combine the voltages or signals proportional to and in fixed relation to alternator current and voltage, current and voltage transformers may preferably be utilized with such transformers having primaries connected to the supply line from the alternator to the load and secondaries across which voltages are developed respectively proportional to and in fixed phase relation to voltage and current. One end of one of the secondaries may be connected to a mid-point of the other with the voltage appearing between the other end of such one of the secondaries and one end of the other of the secondaries being proportional to the vector sum of voltages proportional to and in fixed phase relation with supply line voltage and current and with the voltage between such other end of such one of the secondaries and the other end of the other of the secondaries being equal to the vector difference between such voltages.

These voltages proportional to the vector sum and difference of voltages derived from supply line current and voltage may be applied to the primaries of a pair of coupling transformers which may have secondaries connected to separate rectifier means.

According to a specific feature of the invention, the rectifier means may have a current flow proportional to the square of applied voltage in a certain range of applied voltage and the system may be operated in a range wherein the expected loads on the alternator will not cause voltages outside the square-law range of operation of the rectifier means. Accordingly, the rectifier means serve to develop a direct current signal, but also serve to square the input signals thereto so as to give an indication of real power.

According to a further feature of the invention, each of the rectifier means is a full-wave rectifier which gives much more rapid response, not only because of rectification of both halves of each cycle but also because less filtering is required. Further, the use of full-wave rectification makes it much easier to operate on the square law range as will appear more fully hereinafter. The use of full-wave rectification is therefore particularly advantageous when the load sense system is used in the alternator control system as described above.

Most preferably, each of these rectifier means may be a full-wave bridge rectifier, so that tapped transformer windings are not required, and selenium rectifiers are preferably employed so that no heater supplies are required, and because selenium rectifiers are very rugged and particularly adapted for alternator control systems such as used in aircraft. Also, selenium rectifiers or the like, are readily matched and in addition, they have a desirable square law characteristic in a particular range.

An object of this invention, accordingly, is to provide an improved load sensing system for giving an accurate power indication.

Another object of this invention is to provide an improved load sensing system having a very rapid response so as to be particularly adapted for use in combination with alternator control systems or the like.

A further object of this invention is to provide an improved load sensing system which is very rugged and reliable in operation so as to be particularly adapted for use in an alternator control system for aircraft, or the like.

This invention contemplates other objects, features and advantages which will become more fully apparent from the following detailed description taken in conjunction with the accompanying drawings which illustrate a preferred embodiment and in which:

Figure 1 is a schematic diagram illustrating an alternator control system which may utilize the load sense system of this invention;

Figure 2 is a schematic diagram illustrating a load sensing system usable in the alternator control system of Figure 1 and constructed according to the principles of this invention;

Figure 3 is a vector diagram illustrating the operation of the load sensing system of Figure 2; and Figure 4 is a graph illustrating the operational characteristics of a preferred form of rectifier utilized in the load sensing system of this invention.

Reference numeral 10 designates a load to which a three-phase supply line 11, including conductors 12, 13 and 14, may be connected. Power for the load 10 may be supplied from a pair of alternator systems 15 and 16 connected to the supply line 11, and additional alternator systems may be connected to the supply line 11, if desired.

This system may be used in large airplanes, such as bombers or the like.

The alternator system 15 may comprise an alternator 17 having output terminals 18, 19 and 20 and a neutral terminal 21. The terminals 18, 19 and 20 may be connected through a branch supply line 22 to the main supply line 11 with the terminal 18 connected through a conductor 23 to conductor 12, with the terminal 19 connected through a conductor 24 to the conductor 13 and with the conductor 20 connected through a conductor 25 to one terminal 26 of a load sense system 27 having a second terminal 28 connected through a conductor 29 to the conductor 14 of the supply line 11. The alternator 17 may, for example, be a 400 cycle three-phase alternator and may be Y-connected with the neutral terminal 21 connected to ground.

A turbine 30 may be used to drive the alternator 17 with the turbine 30 being driven by pressurized air supplied through an air duct 31. Alternator output may be controlled through a valve 32 in the air supply duct 31, the valve 32, in turn, being controlled by a controller 33 which may have terminals 34 and 35 connected through conductors 36 and 37 to output terminals 38 and 39 of an amplifier 40. The amplifier 40 may be of a thyratron-controlled amplifier or an amplidyne, or the like, but preferably it may be a magnetic amplifier.

The amplifier 40 may have input terminals 41 and 42 connected through conductors 43 and 44 to output terminals 45 and 46 of a mixer 47.

The mixer 47 may have one pair of input terminals 48 and 49 connected through conductors 51 and 52, output terminals 53 and 54 of the load sense system 27. The mixer 47 may also have a pair of input terminals 55 and 56 connected through conductors 57 and 58 to output terminals 59 and 60 of a speed sense system 61 driven from the alternator 17 or turbine 30.

In operation, the load sensing system 27 and speed sensing system 61 may supply direct current signals which are combined in the mixer 47 and applied to the amplifier 40 which through the controller 33, controls the valve 32 to operate the alternator at a predetermined speed for any given value of load, independent of any other factor. Preferably, the speed may decrease as the load increases to give a predetermined drooping characteristic which, unlike the characteristic that would be obtained without the regulating system, is independent of any other factor, such as input air pressure, for example.

This fixed drooping speed-load characteristic, which may be termed a "scheduled droop," makes it possible to parallel a plurality of alternators and maintain a predetermined load division therebetween.

The alternator system 16 may be identical to the alternator system 15 and may comprise an alternator 62, a turbine 63, a load sense system 64, an air duct 65, an air valve 66, a controller 67, an amplifier 68, a mixer 69 and a speed sense system 70 corresponding to the same elements in the alternator system 15.

To maintain a proper load division between the alternators 17 and 62, the systems may be interconnected in any desired fashion, one manner of interconnection being indicated diagrammatically by a line 71 between the mixer 47 and the mixer 69.

It will be readily appreciated by those skilled in the art that in order to prevent "hunting" oscillations and the like, and to obtain a stable control, it is essential that the load sensing systems 27 and 64 and the speed sensing systems 61 and 70, as well as the other elements of the systems, must have very rapid response, and that the more rapid the response, the more stable and reliable the control.

This invention is concerned with the construction of the load sensing systems 27 and 64, which may be identical, the load sensing system 27 being illustrated diagrammatically in Figure 2. Referring thereto, a current transformer 72 may have a primary 73 in the form of a straight wire connected between the terminals 26 and 28 and a secondary 74 in the form of a coil wound around the primary 73. A voltage transformer 75 may have a primary 76 connected between the terminal 28 and ground and a secondary 77.

The current transformer secondary 74 and the voltage transformer secondary 77 are preferably so connected as to obtain one signal proportional to the vector sum of voltages proportional to and in fixed phase relation to alternator current and voltage and a second signal proportional to the vector difference between such voltages. For this purpose, a pair of resistors 78 and 89, preferably having equal resistances, may be connected in series across one of the secondary windings such as the secondary winding 74 of the transformer 72. The junction between the resistors 78 and 79 is connected to one end of the other secondary, the voltage transformer secondary 77. With this arrangement the voltage appearing between the other end of the voltage transformer secondary 77, at a circuit point 80, and one end of the current transformer secondary 74, at a circuit point 81, will be proportional to the vector sum of a voltage proportional to and in phase with voltage. Likewise the voltage appearing between the circuit point 80 and a circuit point 82 connected to the other side of the current transformer secondary 74, proportional to the vector difference between such voltage.

The signal appearing between circuit points 80—81 and the signal appearing between circuit points 80—82 are each rectified and then the rectified signals are combined to give an output signal indicative of power. For this purpose, a pair of coupling transformers 83 and 84 are provided having primaries 85 and 86 and secondaries 87 and 88, respectively. The primary 85 may be connected between the circuit points 80—81 while the primary 86 may be connected between the circuit points 80—82. The secondaries 87 and 88 may be connected to separate rectifier means 89 and 90 each of which is preferably a full-wave rectifier and most preferably, each of the rectifier means 89 and 90 is a full-wave bridge rectifier utilizing selenium rectifier elements, the rectifier means 89 comprising four selenium rectifier elements 91 and the rectifier means 90 comprising four selenium rectifier elements 92.

Before combining the outputs of the rectifier means 89 and 90, each of such outputs may preferably be filtered. For this purpose, a resistor 93 and a capacitor 94 may be connected in parallel across the output of the rectifier means 89 with a resistor 95 and a capacitor 96 connected in parallel across the output of the rectifier means 90. These outputs are combined with the difference between the rectified, filtered output of the rectifier means 89 and the rectified, filtered output of the rectifier means 90 appearing between circuit points 97 and 98.

In many systems, further filtering is unnecessary and often undesirable and the circuit points 97 and 98 may be connected to output terminals 99 and 100 for connection in a control system. In other systems, however, it may be desirable to have a predetermined lag between a change in power and the corresponding output signal. For this purpose, a resistor 101 and a capacitor 102 may be connected in series between the circuit points 97 and 98 and the terminals of the capacitor 102 may be connected to conductors 103 and 104 to the output terminals 54 and 53, respectively.

Referring now to Figure 3, line 105 represents the voltage across voltage transformer secondary 77 which, of course, is proportional to alternator voltage. Vector line 106 represents the voltage appearing between the junction of resistors 78 and 79 and the circuit points 81 while vector line 107 represents a voltage appearing between the junction between resistors 78 and 79 and the circuit point 82. The voltages represented by vector lines 106 and 107 are each, of course, proportional to alternator current, 180° out of phase. If we assume that the voltage represented by vector 106 is in phase with alternator current, then the voltage represented by vector line 107 is out of phase therewith. The angle between vector lines 106 and 105 is designated by the conventional symbol $\theta$.

Vector line 108 represents the voltage appearing between circuit points 80 and 81 which, of course, is equal to the vector sum of the voltages represented by lines 105 and 106. Vector line 109 represents the voltage appearing between circuit points 80 and 82 which, of course, is equal to the vector sum of the voltages represented by lines 105 and 107 and is also equal to the vector difference between the voltages represented by vector lines 105 and 106, assuming that the resistors 78 and 79 have equal resistances.

It will be apparent that the line 108 is the hypotenuse of a right triangle having a horizontal leg or side equal to:

$$K_1 V + K_2 I \cos \theta$$

and a vertical leg equal to:

$$K_2 I \sin \theta$$

since the hypotenuse of a right triangle is equal to the square root of the sum of the squares of the sides, the magnitude of the line 108 is equal to:

$$\sqrt{(K_1 V + K_2 I \cos \theta)^2 + (K_2 I \sin \theta)^2}$$

Similarly, the magnitude of the line 109 is equal to:

$$\sqrt{(K_1 V - K_2 I \cos \theta)^2 + (-K_2 I \sin \theta)^2}$$

In the load sensing system of this invention, the rectifier means 89 and 90 may be operated in a range wherein the output thereof is equal to the square of the input thereto. Accordingly, the output of the rectifier means 89 may be proportional to:

$$(K_1 V)^2 + 2K_1 V K_2 I \cos \theta + (K_2 I \cos \theta)^2 + (K_2 I \sin \theta)^2$$

and the output of the rectifier means 90 may be proportional to:

$$(K_1 V)^2 - 2K_1 V K_2 I \cos \theta + (K_2 I \cos \theta)^2 + (K_2 I \sin \theta)^2$$

These outputs of the rectifier means 89 and 90 are combined to obtain the difference therebetween. Hence the last expression is subtracted from the next to the last expression and this difference is equal to:

$$4 K_1 K_2 V I \cos \theta$$

Since power is equal to:

$$V I \cos \theta$$

it will be readily apparent that the output of the rectifier means 89 and 90, as combined, is directly proportional to the real power output of the alternator.

Figure 4 is a graph illustrating the performance of a selenium rectifier such as is preferably employed in the load sensing means of this invention. In this graph, the current through the rectifier is plotted against the voltage thereacross and it will be seen that up to a certain point indicated by reference numeral 110, the current is almost exactly proportional to the square of the input voltage. Beyond this point, any increase in current is directly proportional to the corresponding increase in voltage. The rectifiers 91 and 92 are therefore operated in the range below a point such as point 110 on their characteristic curve.

It will be apparent from the vector diagram of Figure 3 that with power factors less than unity, the input to one of the rectifiers 89, 90 will be out of phase with the other and hence if the signals were combined with no filtering at the outputs of the rectifiers, very peculiar wave shapes might be obtained which would give faulty indications when filtered to obtain the direct current component. It is therefore desirable to filter the rectifier outputs, before combining the same.

This filtering may preferably be achieved with resistance, capacitance combinations such as resistors 93, 95 the capacitors 94, 96 as heretofore described. The values of such resistors and capacitors is of some importance in the operation of the load sensing system. In particular, a large capacitance is desirable to improve filtering but using too large a capacitance results in giving a peak indication of the voltage across the transformer secondaries 87, 88 which, of course, is undesirable because the output voltages should be equal to the square of the input voltages to give an accurate indication of power.

The effect of a large capacitance could be compensated for by using a small resistance but such would result in a high current, which might well go beyond the square law characteristics of the rectifier elements. It is therefore desirable to use a comparatively small capacitance with a large resistance. That is, the load on the circuit should be as low as possible and the capacitance should be only large enough to obtain proper filtering action. Preferably, the time constant of each filter should be of the same order of magnitude as the duration of one cycle at the applied frequency.

As heretofore pointed out, the full-wave rectification of each voltage is desirable to obtain rapid response. It should be noted that it is further desirable because the current flows twice each cycle as opposed to only once each cycle with half-wave rectification and hence the required peak current flow is cut in half so that it is much easier to operate rectifiers in the square law range. It is further important that with full-wave rectification, the ripple frequency is twice what it would be with half-wave rectification and to obtain the required filtering, the capacitor of the filter need only be half what it would be with half-wave rectification and by reducing the size of the capacitor, the output voltage can correspond with much greater accuracy to the square of the voltage input.

It may further be noted that selenium rectifiers, or rectifiers of similar construction and operation, are particularly desirable because of their square law characteristics, because of the fact that they do not require filament or heater supplies and are hence readily used in a bridge arrangement, and because they are very rugged and reliable, and are particularly suitable for control systems in aircraft. Also, selenium rectifiers may be readily matched. It will be understood, of course, that the term "selenium rectifier" is used in a sense to include equivalent rectifier structures. As used herein, of the same order of magnitude as a given quantity means between 0.1 and 10 times such quantity.

It will be further understood that various modifications may be effected without departing from the spirit and scope of the novel concepts of the present invention.

We claim as our invention:

1. Load sensing apparatus for sensing the power flow in an alternating current supply line, comprising: current and voltage transformers having primaries connected to said line and secondaries across which voltages are developed respectively proportional to and in fixed phase relation to supply line voltage and current, a pair of resistors connected in series across the secondary of said current transformer, means connecting one end of the secondary of said voltage transformer to the junction between said resistors, a first coupling transformer having a primary connected between the other end of the secondary of said voltage transformer and one end of the secondary of said current transformer and having a secondary across which a voltage is developed equal to the vector sum of a voltage proportional to and in phase with current and a voltage proportional to and in phase with voltage, a second coupling transformer having a primary connected between said other end of the secondary of said voltage transformer and the other end of the secondary of said current transformer and having the secondary across which a voltage is developed equal to the vector difference between a voltage proportional to and in phase with voltage and a voltage proportional to and in phase with current, first rectifier means connected to said secondary of said first coupling transformer, second rectifier means connected to the secondary of said second coupling transformer, and means combining the outputs of said rectifiers to give a signal indicative of power.

2. Load sensing apparatus for sensing the power flow in an alternating current supply line, comprising: means for developing voltages respectively proportional to and in fixed phase relation to line voltage and line current, means for developing signals respectively proportional to the vector sum and the vector difference of said voltages, rectifier means for rectifying each of said signals and having a characteristic so related to the maximum power flow in the supply line as to develop output voltages having average values proportional to the squares of the respective signals, means for filtering said output voltages, and means for combining the filtered output voltages to provide a signal proportional to power.

References Cited in the file of this patent

UNITED STATES PATENTS

| | | |
|---|---|---|
| 2,057,490 | Jenks | Oct. 13, 1936 |
| 2,428,566 | Harder et al. | Oct. 7, 1947 |
| 2,448,442 | Kirschbaum | Aug. 31, 1948 |
| 2,501,340 | Kresser | Mar. 21, 1950 |
| 2,509,728 | Desch et al. | May 30, 1950 |
| 2,602,154 | Sikorra | July 1, 1952 |
| 2,608,679 | Witzke | Aug. 26, 1952 |
| 2,636,132 | Stineman et al. | Apr. 21, 1953 |
| 2,672,585 | Hotson | Mar. 16, 1954 |
| 2,724,781 | Stineman | Nov. 22, 1955 |
| 2,732,507 | Stineman | Jan. 24, 1956 |